Feb. 24, 1931.       R. G. DYKEMAN       1,793,916
PACKING RING
Filed June 26, 1924
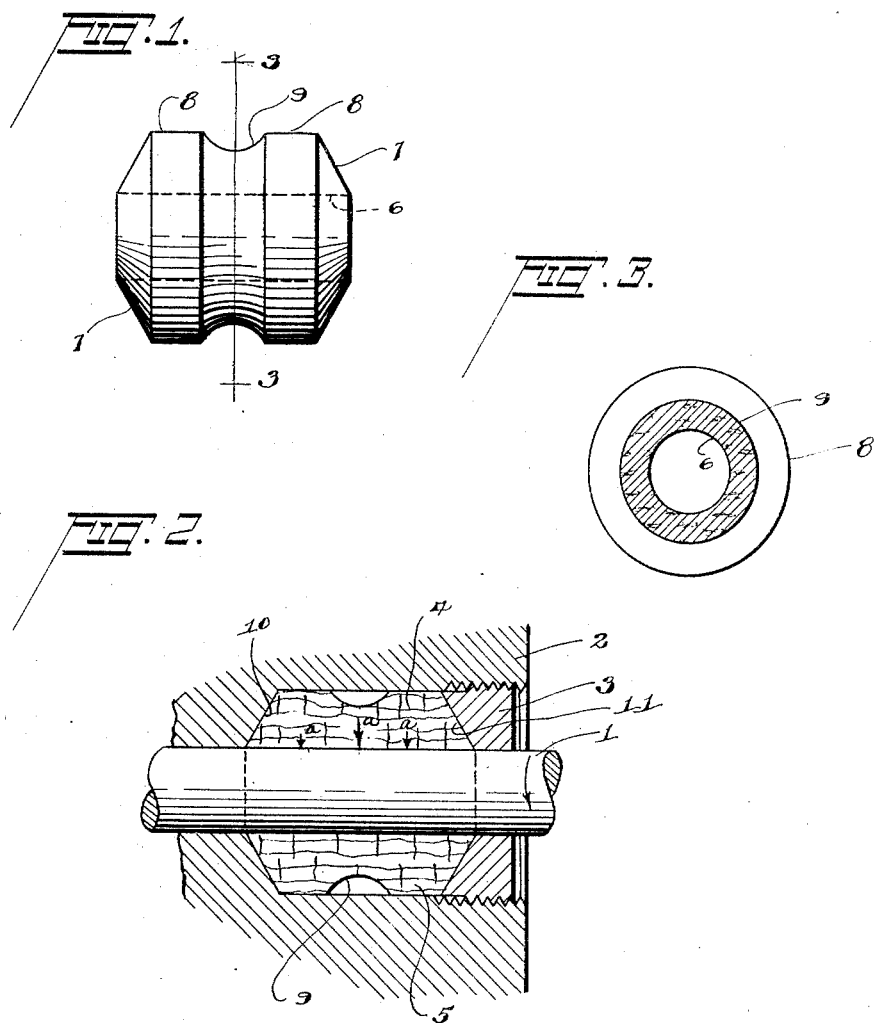
INVENTOR
R. G. Dykeman
BY Robert H. Young
ATTORNEY Patented Feb. 24, 1931

1,793,916

UNITED STATES PATENT OFFICE

REUBEN G. DYKEMAN, OF DAYTON, OHIO

PACKING RING

Application filed June 26, 1924. Serial No. 722,480.

This invention relates to a packing ring, particularly adaptable to gasoline pumps. The primary object of the invention is the provision of a packing ring of cork which is provided with a peripheral groove of a depth sufficient to permit the outer parts of the ring to collapse together to a considerable extent when installed, and thereby cause a tendency for the walls of the ring to buckle inwardly where they are in contact with the shaft.

The packing ring is constructed of a single piece of cork with the grain running parallel to the shaft so that the pores which extend at right angles to the axis of the shaft are closed by an endwise pressure on the ring. The edges of the ring are tapered and a cylindrical portion is provided on each side of the peripheral groove to prevent the total collapse of the outer portions of the ring.

Further objects and advantages will be more fully set forth in the attached specification, in the claims, and in the drawings, in which:

Fig. 1 is a side elevation of my improved packing ring.

Fig. 2 is a section of a ring as installed on a rotating shaft, and

Fig. 3 is a cross section on the line 3—3 of Fig. 1.

Referring more particularly to the drawings, a shaft 1 of a gasoline pump, herein shown as adapted to rotate, is suitably mounted in the fixed bearing member 2 which may be one of the walls of the pump. A packing nut 3 is screwed into the bearing member 2 and is adapted to hold the packing ring 4 in position. The packing ring is constructed of cork, a single piece of cork being preferably used, the grain running parallel to the shaft. The pores of the cork will then extend at right angles to the axis of the shaft as shown by the numeral 5.

The ring is provided with a central circular bore 6 for the reception of the shaft, and the ends of the ring are bevelled at an angle of approximately 60°, as shown at 7. An exterior central circumferential or peripheral groove 9 is provided in the packing ring and cylindrical portions 8 are provided one on each side of the central groove and between the groove and the tapered ends.

The thickness of the cork from the shaft outwardly at the cylindrical portions of the ring is about one-fourth of the over-all length of the ring, and the depth of the groove is about two-fifths of the thickness of the cork at the cylindrical portions of the ring. It will also be noted that the cylindrical portions of the ring are slightly smaller in their length than the width of the groove. These various dimensions are approximate, but it has been found that if they are followed to a considerable extent, the leak-proof qualities of the ring will be at their best.

The provision of a semi-circular groove 9 of a depth as previously set forth, permits the outer walls of the ring to collapse to a considerable extent partly closing up the groove when the ring is installed, and the packing nut is tightened. The bevelled sides 10 and 11 in the bearing member and in the packing nut respectively, are both provided at an angle of 60° to the axis of the shaft, so as to correspond to the angle of the bevelled ends of the packing ring. When the packing nut is tightened, pressure is applied along lines parallel to the shaft, thus compressing the packing ring endwise at the inner walls thereof and partly closing the peripheral groove at the outer portions, the outer portions merely collapsing together instead of being compressed, due to the provision of the groove. This will result in a tendency for the inner walls of the ring to buckle inwardly at the center of the ring, thus tightly sealing the space between the ring and the shaft to prevent any leakage of gasoline or other fluid. The greatest pressure against the shaft occurs at the center of the packing ring, as indicated by the arrows $a$ in Fig. 2. The pores of the cork are tightly closed along the inner walls of the ring when the packing nut is tightened. Those pores at the outer portions of the packing ring are more or less closed, depending upon how much the packing nut is tightened, and the depth of the groove 9. In the course of time as wear occurs at the central inner portions of the ring, it is merely necessary to tighten the packing nut and increase the pressure at the central inner portion of the ring against the shaft by further collapsing the groove due to this increased endwise pressure caused by the packing nut. The provision of the cylindrical portions 8 permit the entire space, provided by the bearing member and the packing nut, to be completely filled and serves to distribute pressures within the cork so that the entire tendency to buckle inwardly at the inner walls is not localized at the center of the ring, but is distributed to some extent through the bearing surface, the greatest pressure being applied at the center of the ring.

I am aware that various changes may be made in the proportions and in the design of the ring without materially departing from the scope of my invention, and I do not desire to be limited to the precise construction which has been shown for the purpose of illustration.

I claim:—

1. A cork packing ring for a moving shaft comprising a piece of cork with the grain running parallel to the shaft, having inwardly tapered outer edges, a central cylindrical bore for the reception of the shaft, and an exterior circumferential groove, the ratio of the depth of the groove to the wall thickness of the cork being more than one to four, so that the outside portions of the ring are permitted to collapse together to a considerable extent when installed and thereby cause a tendency for the inner walls to buckle inwardly at the center.

2. A packing body composed of layers of natural longitudinal and parallelly arranged fibres having pores running at substantially right angles to said fibres and formed of portions tapering toward their ends, and a bore in said body parallelly disposed with respect to said fibres and adapted to receive a shaft.

3. A packing sleeve, adapted to be received within a cylindrical stuffing box and having a shaft receiving bore, composed of layers of natural longitudinally arranged fibres running parallel with the bore in said sleeve and having pores running at substantially right angles to said fibres, said sleeve being tapered at each end and provided with a peripheral groove to form a plurality of cylindrical portions for sealing with the inner wall of said stuffing box.

In testimony whereof I affix my signature.

REUBEN G. DYKEMAN.